United States Patent
Jung (10) Patent No.: US 8,698,089 B2
(45) Date of Patent: Apr. 15, 2014

(54) PHOTO DETECTING PIXELS AND X-RAY DETECTOR INCLUDING THE SAME

(75) Inventor: Kwan-Wook Jung, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 382 days.

(21) Appl. No.: 12/964,118

(22) Filed: Dec. 9, 2010

(65) Prior Publication Data

US 2011/0278465 A1    Nov. 17, 2011

(30) Foreign Application Priority Data

May 14, 2010    (KR) ................ 10-2010-0045478

(51) Int. Cl.
*G01T 1/20*    (2006.01)

(52) U.S. Cl.
USPC ................ 250/370.09; 250/370.11

(58) Field of Classification Search
USPC ................ 250/370.09–370.14
See application file for complete search history.

(56) References Cited

U.S. PATENT DOCUMENTS

| | | | |
|---|---|---|---|
| 5,352,884 A | 10/1994 | Petrick et al. | |
| 7,638,752 B2 | 12/2009 | Partain et al. | |
| 7,659,517 B2 | 2/2010 | Scheffer | |
| 2002/0001038 A1* | 1/2002 | Lee | 348/308 |
| 2003/0141497 A1 | 7/2003 | Watanabe | |
| 2007/0290143 A1* | 12/2007 | Kameshima et al. | 250/370.09 |
| 2008/0179531 A1* | 7/2008 | Scheffer | 250/370.11 |
| 2009/0245465 A1 | 10/2009 | Jung et al. | |

FOREIGN PATENT DOCUMENTS

| | | |
|---|---|---|
| JP | 2003-224777 A | 8/2003 |
| KR | 10 2007-0016382 A | 2/2007 |
| KR | 10-2009-0083817 A | 8/2009 |
| KR | 10-2009-0102185 A | 9/2009 |
| KR | 10 2009-0102185 A | 9/2009 |

OTHER PUBLICATIONS

Korean Notice of Allowance in KR 10-2010-0045478, dated May 25, 2012 (Jung).
Office Action issued in corresponding Korean application, 10-2010-0045478, dated May 19, 2011.

* cited by examiner

*Primary Examiner* — Casey Bryant
(74) *Attorney, Agent, or Firm* — Lee & Morse, P.C.

(57) ABSTRACT

An X-ray detector including photodetecting pixels that reduce kTC switching noise. Each pixel includes a first transistor having a first electrode connected to a first power line, a second electrode connected to a first node, and a gate electrode receiving the reset signal; a second transistor having a first electrode connected to the first power line, a second electrode connected to a second node, and a gate electrode connected to the first node; a third transistor having a first electrode connected to the second node, a second electrode connected to a data line, and a gate electrode connected to a gate line; a fourth transistor having a first electrode connected to the first node, a second electrode connected to a photodetecting diode, and a gate electrode receiving the control signal; and the photodetecting diode having a first electrode connected to the fourth transistor, and a second electrode connected to ground.

13 Claims, 4 Drawing Sheets

PHOTO DETECTING PIXELS AND X-RAY DETECTOR INCLUDING THE SAME

CROSS-REFERENCE TO RELATED APPLICATION

This application claims the benefit of Korean Patent Application No. 10-2010-0045478, filed on May 14, 2010, in the Korean Intellectual Property Office, the disclosure of which is incorporated herein by reference.

BACKGROUND

1. Field

An aspect of the present invention relates to photo detecting pixels and an X-ray detector including the same.

2. Description of the Related Art

In general, an X-ray detector is used in medical diagnosis to detect and provide an X-ray image of a subject, the X-ray image being formed by an X-ray radiated from an X-ray generator, to a display apparatus. Currently, a flat panel X-ray detector employing digital radiography, that is, not requiring a photographic film, is popularly used. The flat panel X-ray detector includes a plurality of photo detecting pixels provided in a flat panel to detect an X-ray.

However, since conventional photo detecting pixels require a waiting time to receive a signal or to obtain an offset voltage, a leakage current may be generated from a pixel, and thus, correlated double sampling (CDS) may not be accurately performed. Accordingly, an X-ray image of a subject may not be accurately detected.

SUMMARY

An aspect of the present invention provides photo detecting pixels capable of reducing kTC switching noise (k: Boltzmann's constant; T: temperature; C: capacitance) by accurately performing correlated double sampling (CDS), and an X-ray detector including the same.

According to an aspect of the present invention, there is provided an X-ray detector including a panel for detecting an X-ray radiated from an X-ray generator and for outputting an electrical signal corresponding to the X-ray, the panel including photo detecting pixels formed at intersections of gate lines with data lines; a driving unit for providing a reset signal and a control signal to the photo detecting pixels and for providing a gate signal to the gate lines; and a signal processing unit connected to the photo detecting pixels via the data lines and for outputting an image signal corresponding to the electrical signal output from the photo detecting pixels, wherein each of the photo detecting pixels includes a first transistor including a first electrode connected to a first power line, a second electrode connected to a first node, and a gate electrode for receiving the reset signal; a second transistor including a first electrode connected to the first power line, a second electrode connected to a second node, and a gate electrode connected to the first node; a third transistor including a first electrode connected to the second node, a second electrode connected to a data line, and a gate electrode connected to a gate line; a fourth transistor including a first electrode connected to the first node, a second electrode connected to a photo detecting diode, and a gate electrode for receiving the control signal; and the photo detecting diode including a first electrode connected to the fourth transistor, and a second electrode connected to ground.

In a first period, the first transistor may receive the reset signal at a first level, be turned on, and initialize the first node, according to an aspect of the invention.

In a second period, the first transistor may receive the reset signal at a second level and be turned off, the second transistor may be turned on and apply a first sample voltage to the second node, and the third transistor may receive the gate signal at the first level, be turned on, and output the first sample voltage to the data line, according to an aspect of the invention.

The gate signal may change to the first level before the reset signal changes to the second level, according to an aspect of the invention.

In a third period, the photo detecting diode may output a photo detecting voltage corresponding to the X-ray, the fourth transistor may receive the control signal at the first level, be turned on, and apply the photo detecting voltage to the first node, the second transistor may be turned on and apply a second sample voltage to the second node, and the third transistor may receive the gate signal at the first level, be turned on, and output the second sample voltage to the data line, according to an aspect of the invention.

The second sample voltage may correspond to a sum of the first sample voltage and the photo detecting voltage, according to an aspect of the invention.

According to an aspect of the present invention, the photo detecting diode may be a positive-intrinsic-negative (PIN) diode.

According to an aspect of the present invention, the first through fourth transistors may be n-type or p-type thin film transistors (TFTs).

According to another aspect of the present invention, there is provided photo detecting pixels included in an X-ray detector, each of the photo detecting pixels including a first transistor including a first electrode connected to a first power line, a second electrode connected to a first node, and a gate electrode for receiving a reset signal; a second transistor including a first electrode connected to the first power line, a second electrode connected to a second node, and a gate electrode connected to the first node; a third transistor including a first electrode connected to the second node, a second electrode connected to a data line, and a gate electrode connected to a gate line; a fourth transistor including a first electrode connected to the first node, a second electrode connected to a photo detecting diode, and a gate electrode for receiving a control signal; and the photo detecting diode including a first electrode connected to the fourth transistor, and a second electrode connected to ground.

According to an aspect of the present invention, in a first period, the first transistor may receive the reset signal at a first level, be turned on, and initialize the first node.

According to an aspect of the present invention, in a second period, the first transistor may receive the reset signal at a second level and be turned off, the second transistor may be turned on and apply a first sample voltage to the second node, and the third transistor may receive the gate signal at the first level, be turned on, and output the first sample voltage to the data line.

According to an aspect of the present invention, the gate signal may change to the first level before the reset signal changes to the second level.

According to an aspect of the invention, in a third period, the photo detecting diode may output a photo detecting voltage corresponding to the X-ray, the fourth transistor may receive the control signal at the first level, be turned on, and apply the photo detecting voltage to the first node, the second transistor may be turned on and apply a second sample voltage to the second node, and the third transistor may receive the gate signal at the first level, be turned on, and output the second sample voltage to the data line.

According to an aspect of the invention, the second sample voltage may correspond to a sum of the first sample voltage and the photo detecting voltage.

According to an aspect of the present invention, the photo detecting diode may be a positive-intrinsic-negative (PIN) diode.

According to an aspect of the present invention, the first through fourth transistors may be n-type or p-type thin film transistors (TFTs).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of exemplary embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
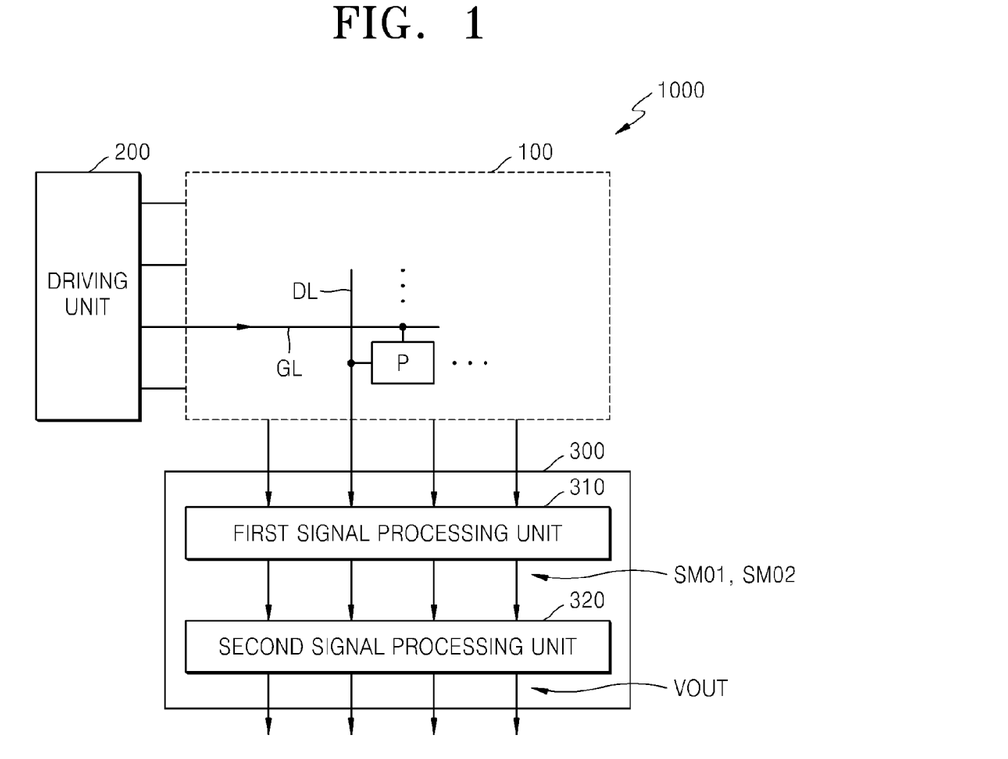
FIG. 1 is a block diagram of an X-ray detector according to an embodiment of the present invention.
Figure 2:
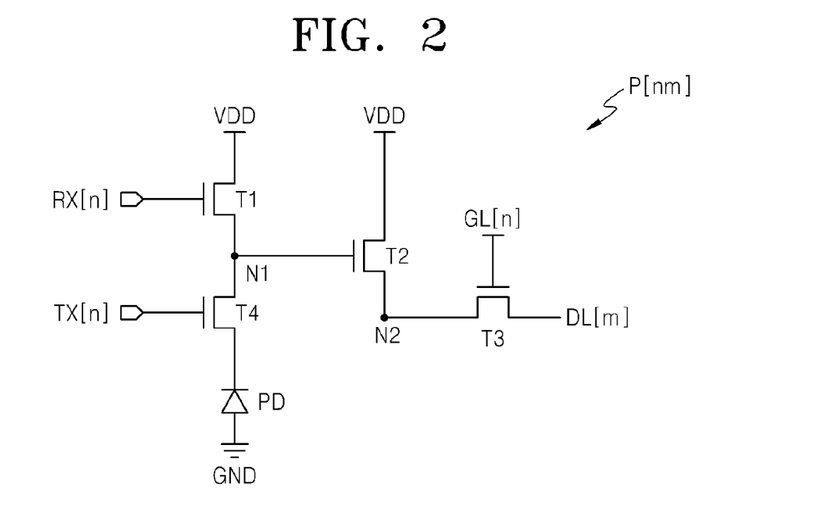
FIG. 2 is a circuit diagram of a photo detecting pixel in the X-ray detector illustrated in FIG. 1.

FIG. 1 is a block diagram of an X-ray detector 1000 according to an embodiment of the present invention. FIG. 2 is a circuit diagram of a photo detecting pixel P in the X-ray detector 1000 illustrated in FIG. 1.

Referring to FIGS. 1 and 2, the X-ray detector 1000 includes a panel 100, a driving unit 200, and a signal processing unit 300. The panel 100 senses an X-ray radiated from an X-ray generator 50 (see FIG. 7) and outputs an electrical signal corresponding to the X-ray, e.g., a voltage. The panel 100 includes photo detecting pixels P formed at intersections of gate lines GL with data lines DL. Also, the panel 100 further includes a plurality of thin film transistors (TFTs) and photo detecting diodes PDs for forming the photo detecting pixels P.

The gate lines GL are formed in a first direction. The data lines DL are formed in a second direction crossing the first direction. The first and second directions may be perpendicular to each other. Although not shown in FIG. 1, the panel 100 may further include a first power line, and reset lines and control lines which are parallel to the gate lines GL.

Each of the photo detecting pixels P includes first through fourth TFTs T1 through T4 and a photo detecting diode PD. FIG. 2 illustrates a photo detecting pixel P[nm] formed at the intersection of an nth gate line GL[n] with an mth data line DL[m]. An nth reset signal RX[n] and an nth control signal TX[n] are applied to the photo detecting pixel P[nm].

Referring to FIG. 2, the photo detecting pixel P[nm] includes the first TFT T1 including a first electrode connected to the first power line for applying a first power voltage VDD, a second electrode connected to a first node N1, and a gate electrode for receiving the nth reset signal RX[n]; the second TFT T2 including a first electrode connected to the first power line, a second electrode connected to a second node N2, and a gate electrode connected to the first node N1; the third TFT T3 including a first electrode connected to the second node N2, a second electrode connected to the mth data line DL[m], and a gate electrode connected to the nth gate line GL[n]; the fourth TFT T4 including a first electrode connected to the first node N1, a second electrode connected to the photo detecting diode PD, and a gate electrode for receiving the nth control signal TX[n]; and the photo detecting diode PD including a first electrode connected to the fourth TFT T4, and a second electrode connected to a ground GND. Although the photo detecting pixel P[nm] in FIG. 2 includes n-type TFTs, the aspects of the present invention are not limited thereto and the photo detecting pixel P[nm] may include p-type TFTs.

The photo detecting diode PD may be a positive-intrinsic-negative (PIN) diode. The photo detecting diode PD receives the X-ray from outside the X-ray detector 1000, and generates an electrical signal, e.g., a photo detecting voltage. The photo detecting voltage may correspond to the intensity of the X-ray. The photo detecting voltage may be formed at a negative (N) electrode of the photo detecting diode PD. Although not shown in FIG. 2, the second electrode of the photo detecting diode PD may be electrically connected to a bias line instead of the ground GND. The bias line may be electrically connected to a positive (P) electrode of the photo detecting diode PD. In this case, the driving unit 200 may be electrically connected to bias lines and may apply a driving voltage to the bias line. For example, the driving unit 200 may selectively apply a first reverse bias or a forward bias to the photo detecting diode PD.

The driving unit 200 is electrically connected to the gate lines GL and applies gate signals to the gate lines GL. The driving unit 200 sequentially applies the gate signals to the gate lines GL along the second direction. For example, if a gate signal at a high level is applied to the nth gate line GL[n], the gate signal may turn on the third TFT T3. On the other hand, if a gate signal at a low level is applied to the nth gate line GL[n], the gate signal may turn off the third TFT T3.

The driving unit 200 is electrically connected to the reset lines and the control lines and applies the nth reset signal RX[n] to an nth reset line, and the nth control signal TX[n] to an nth control line. For example, if the nth reset signal RX[n]

at a high level is applied to the nth reset line, the nth reset signal RX[n] may turn on the first TFT T1. On the other hand, the nth reset signal RX[n] at a low level is applied to the nth reset line, the nth reset signal RX[n] may turn off the first TFT T1. Also, if the nth control signal TX[n] at a high level is applied to the nth control line, the nth control signal TX[n] may turn on the fourth TFT T4. On the other hand, if the nth control signal TX[n] at a low level is applied to the nth control line, the nth control signal TX[n] may turn off the fourth TFT T4.

The signal processing unit 300 is electrically connected to the data lines DL and receives an electrical signal, e.g., a sample input voltage, from the data lines DL. Here, the sample input voltage may be first and second sample voltages.

The signal processing unit 300 may receive the first sample voltage from the mth data line DL[m] when the second and third TFTs T2 and T3 are turned on and the fourth TFT T4 is turned off by the nth control signal TX[n] at a low level. For example, the first sample voltage may correspond to a difference between the first power voltage VDD and a threshold voltage of the second TFT T2 and thus may be an offset voltage to be removed in order to obtain a pure photo detecting voltage.

The signal processing unit 300 may receive the second sample voltage from the mth data line DL[m] when the photo detecting diode PD outputs the photo detecting voltage, the second and third TFTs T2 and T3 are turned on, and the fourth TFT T4 is turned on by the nth control signal TX[n] at a high level. That is, if the fourth TFT T4 is turned on by the nth control signal TX[n] at a high level, the mth data line DL[m] is electrically connected to the N electrode of the photo detecting diode PD, and the photo detecting voltage formed at the N electrode may be transmitted to the signal processing unit 300 via the first through fourth TFTs T1 through T4 and the mth data line DL[m]. For example, the second sample voltage may correspond to a sum of the photo detecting voltage and the first sample voltage.

The signal processing unit 300 may output an image signal VOUT to outside the X-ray detector 1000 by using the first and second sample voltages. The image signal VOUT may be an analog or digital signal corresponding to the photo detecting voltage. That is, the signal processing unit 300 may generate the photo detecting voltage from which the offset voltage is removed by subtracting the first sample voltage from the second sample voltage. Accordingly, the image signal VOUT may be output in response to the photo detecting voltage. For example, the signal processing unit 300 may include a photo detecting output unit or a first signal processing unit 310 and a second signal processing unit 320.

The photo detecting output unit 310 is electrically connected to the data lines DL. The photo detecting output unit 310 receives the first and second sample voltages from each of the data lines DL. The photo detecting output unit 310 outputs first and second sample signals SMO1 and SMO2 in response to the first and second sample voltages. For example, the first sample signal SMO1 may be an analog signal corresponding to the first sample voltage, and the second sample signal SMO2 may be an analog signal corresponding to the second sample voltage.

The second signal processing unit 320 is electrically connected to the first signal processing unit 310 and receives the first and second sample signals SMO1 and SMO2. The second signal processing unit 320 outputs the image signal VOUT in response to the first and second sample signals SMO1 and SMO2. That is, the second signal processing unit 320 may output the image signal VOUT corresponding to the photo detecting voltage by subtracting the first sample signal SMO1 from the second sample signal SMO2.

Figure 3:
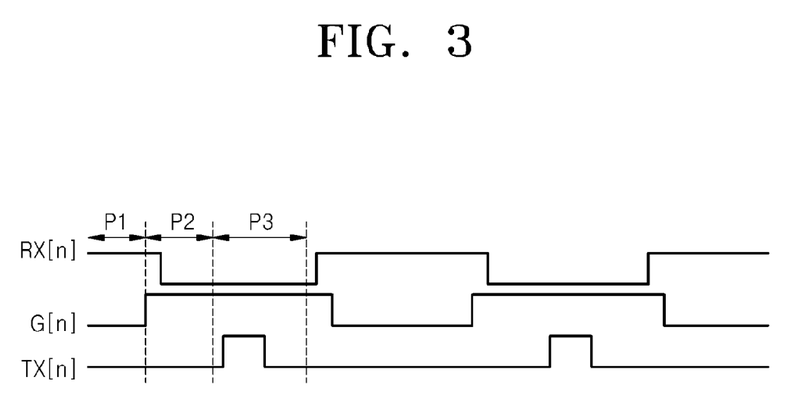
FIG. 3 is a timing diagram for describing a method of driving the photo detecting pixel illustrated in FIG. 2.
Figure 4:
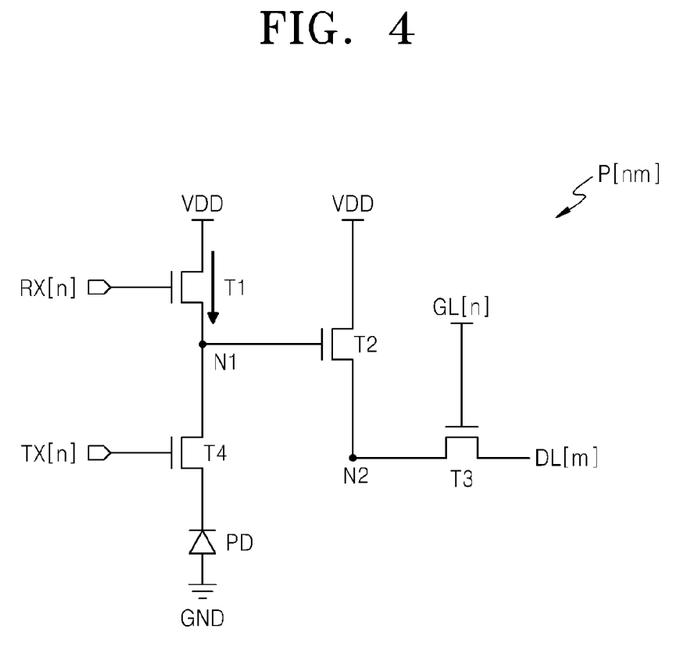
FIGS. 4 through 6 are circuit diagrams of the photo detecting pixel illustrated in FIG. 2, which is driven according to the timing diagram of FIG. 3.
Figure 5:
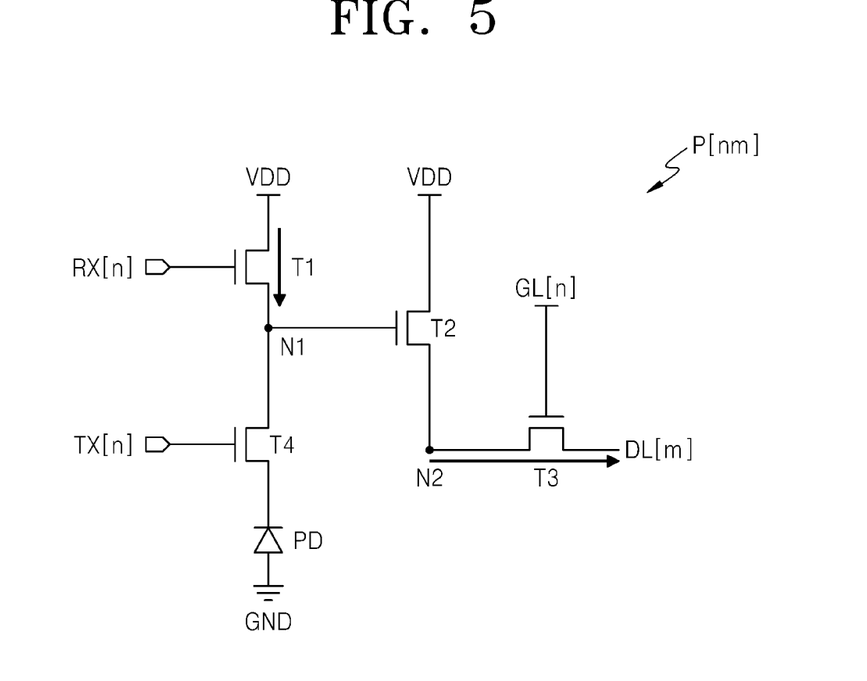
Figure 6:
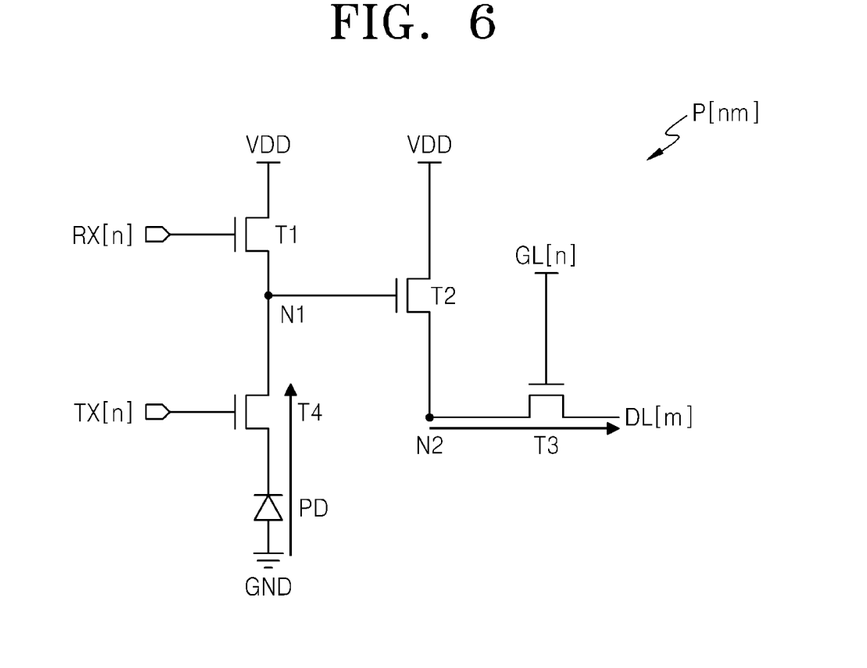

A method of driving the photo detecting pixel P[nm] illustrated in FIG. 2 will now be described in detail. FIG. 3 is a timing diagram for describing a method of driving the photo detecting pixel P[nm] illustrated in FIG. 2. FIGS. 4 through 6 are circuit diagrams of the photo detecting pixel P[nm] illustrated in FIG. 2, which is driven according to the timing diagram of FIG. 3.

Referring to FIG. 3, the photo detecting pixel P[nm] operates in unit periods including a first period P1 in which the nth reset signal RX[n] is at a first level; a second period P2 in which the nth reset signal RX[n] changes to a second level, an nth gate signal G[n] is at the first level, and the nth control signal TX[n] is at the second level; and a third period P3 in which the nth gate signal G[n] is at the first level, and the nth control signal TX[n] changes from the second level to the first level and then to the second level. Here, the first level may be a high level and the second level may be a low level.

Referring to FIG. 4, in the first period P1, the nth reset signal RX[n] is at the first level and thus the first TFT T1 is turned on. Accordingly, the first power voltage VDD is applied to the first node N1 and thus the first node N1 is initialized. In this case, a voltage difference between the gate and source electrodes of the second TFT T2 is lower than a threshold voltage (a subthreshold voltage) and thus the voltage of the second node N2 is unknown.

Referring to FIG. 5, in the second period P2, the nth reset signal RX[n] changes to the second level and thus the first TFT T1 is turned off. The first node N1 is maintained at the level of the first power voltage VDD that is applied in the first period P1. Also, the second TFT T2 is turned on to operate in a saturation region and the first sample voltage is applied to the second node N2. Here, the first sample voltage is represented as in Equation 1. In Equation 1, VDD represents the first power voltage and Vth2 represents the threshold voltage of the second TFT T2.

$$\text{First SampleVoltage} = VDD - Vth2 \quad \text{Equation 1}$$

In the second period P2, the nth gate signal G[n] at the first level is applied and thus the third TFT T3 is turned on. As such, the first sample voltage is output to the mth data line DL[m] connected to the third TFT T3. According to an embodiment of the present invention, in the second period P2, the nth gate signal G[n] changes to the first level before the nth reset signal RX[n] changes to the second level. As such, the second TFT T2 may be turned on to operate in the saturation region.

Referring to FIG. 6, in the third period P3, the nth reset signal RX[n] is maintained at the second level. Accordingly, the first TFT T1 is turned off. In the third period P3, an X-ray or light corresponding to the X-ray is applied to the photo detecting pixel P[nm]. The photo detecting diode PD included in the photo detecting pixel P[nm] outputs the photo detecting voltage corresponding to the X-ray. In the third period P3, the nth control signal TX[n] changes from the second level to the first level and the photo detecting voltage output from the photo detecting diode PD is applied to the first node N1. Accordingly, the voltage of the first node N1 is represented as in Equation 2. In Equation 2, Vsig represents the photo detecting voltage.

$$N1\text{Voltage} = VDD - |Vsig| \quad \text{Equation 2}$$

The second TFT T2 is turned on to operate in the saturation region and thus applies the second sample voltage to the second node N2. Here, the second sample voltage is represented as in Equation 3. That is, the second sample voltage may correspond to a sum of the first sample voltage and the photo detecting voltage. In Equation 3, VDD represents the first power voltage, Vth2 represents the threshold voltage of the second TFT T2, and Vsig represents the photo detecting voltage.

$$\text{Second SampleVoltage} = VDD - Vth2 - |Vsig| \quad \text{Equation 3}$$

In the third period P3, the nth gate signal G[n] at the first level is applied and thus the third TFT T3 is turned on. As such, the second sample voltage is output to the mth data line DL[m] connected to the third TFT T3.

As described above, the first and second sample voltages are applied to the signal processing unit 300 via the mth data line DL[m]. The signal processing unit 300 may generate the photo detecting voltage from which the offset voltage is removed by subtracting the first sample voltage from the second sample voltage, and may output the image signal VOUT in response to the photo detecting voltage. Operation of the signal processing unit 300 has been described in detail above.

As described above, according to an aspect of the present invention, a photo detecting pixel including four transistors sequentially obtains a reset voltage, a first sample voltage, and a second sample voltage. Here, the first sample voltage corresponds to an offset voltage, and the second sample voltage corresponds to a signal including the offset voltage. Consequently, a signal from which the offset voltage is removed, i.e., a photo detecting voltage, may be output by subtracting the first sample voltage from the second sample voltage. That is, if a sample input voltage is obtained after a reset voltage is input, the same operation is repeated when the reset and sample voltages are obtained and thus the accuracy of correlated double sampling (CDS) may be increased. Accordingly, as CDS is accurately performed, kTC switching noise (k: Boltzmann's constant; T: temperature; C: capacitance) may be reduced.

Figure 7:
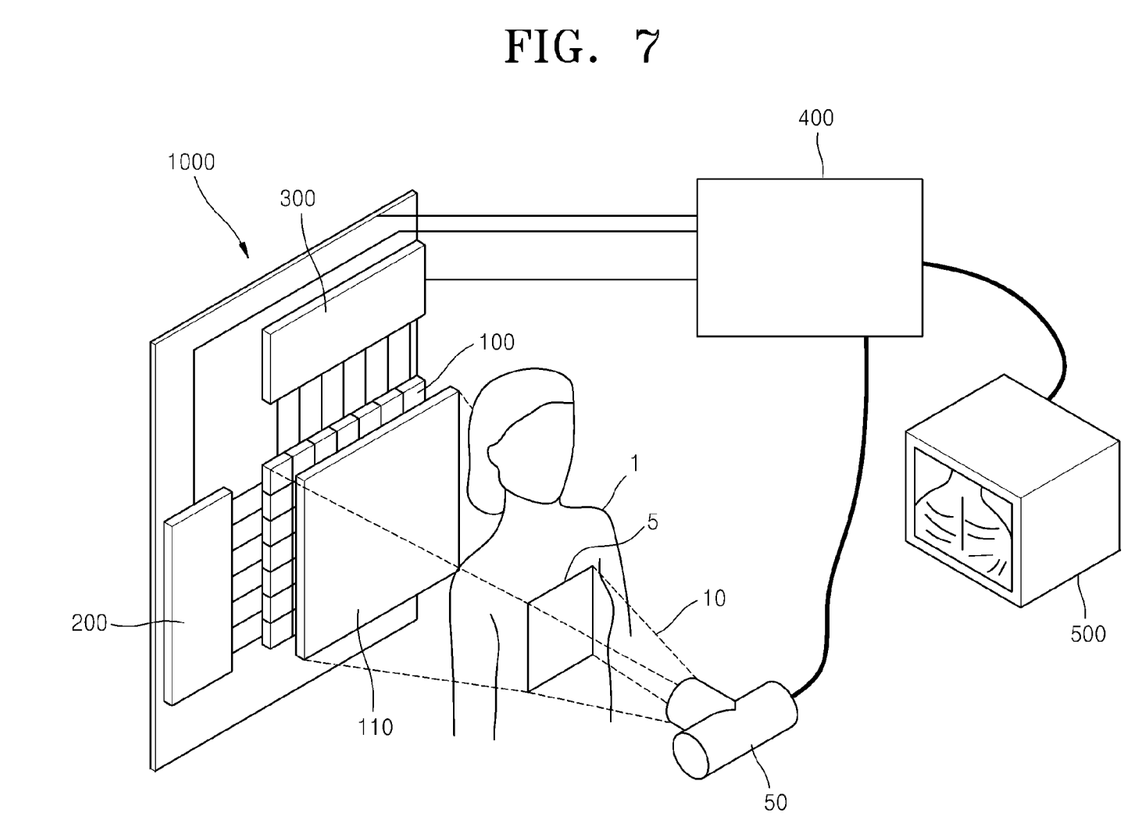
FIG. 7 is a schematic diagram of an X-ray system including the X-ray detector illustrated in FIG. 1, according to an embodiment of the present invention.

FIG. 7 is a schematic diagram of an X-ray system including the X-ray detector 1000 illustrated in FIG. 1, according to an embodiment of the present invention. Referring to FIG. 7, the X-ray system includes an X-ray generator 50 for radiating an X-ray 10 onto a test region 5 of a test body 1, the X-ray detector 1000 for outputting the X-ray 10 transmitted through the test region 5, as an electrical signal, a display device 500 for receiving an image signal corresponding to the electrical signal, from the X-ray detector 1000, and displaying an image, and a controller 400 for generally controlling the X-ray generator 50, the X-ray detector 1000, and the display device 500. While not required, the controller 400 can be implemented using a computer.

In the X-ray system, when the X-ray 10 is radiated onto the test region 5 of the test body 1, a scintillator 110 located between a panel 100 of the X-ray detector 1000 and the test body 1 converts the X-ray 10 transmitted through the test body 1 into green light and provides the green light to the panel 100.

The X-ray detector 1000 has been described in detail above in relation to FIGS. 1 and 2. The electrical signal output from the X-ray detector 1000 is converted into the image signal by a signal processing unit 300 and then is provided to the display device 500.

Accordingly, the display device 500 may display an X-ray image corresponding to the image signal in real time. For example, the display device 500 may be a liquid crystal display (LCD) device, an organic light-emitting display device, a plasma display device or the like.

As described above, according to an aspect of the present invention, as a photo detecting pixel including four transistors sequentially obtains a reset voltage, an offset voltage, and a signal including the offset voltage, CDS may be accurately performed. Accordingly, kTC switching noise may be reduced.

Although elements illustrated in the drawings may be magnified or reduced for convenience of explanation, the aspects of the present invention are not limited to sizes and shapes of the elements.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An X-ray detector, comprising:
a panel for detecting an X-ray radiated from an X-ray generator and for outputting an electrical signal corresponding to the X-ray, the panel including photo detecting pixels formed at intersections of gate lines with data lines;
a driving unit for providing a reset signal and a control signal to the photo detecting pixels and for providing a gate signal to the gate lines;
a plurality of signal lines coupled between the driving unit and the photo detecting pixels of the panel; and
a signal processing unit connected to the photo detecting pixels via the data lines and for outputting an image signal corresponding to the electrical signal output from the photo detecting pixels,
wherein each of the photo detecting pixels includes:
a first transistor including a first electrode connected to a first power line, a second electrode connected to a first node, and a gate electrode for receiving the reset signal;
a second transistor including a first electrode connected to the first power line, a second electrode connected to a second node, and a gate electrode connected to the first node;
a third transistor including a first electrode connected to the second node, a second electrode connected to one of the data lines, and a gate electrode connected to one of the gate lines;
a fourth transistor including a first electrode connected to the first node, a second electrode connected to a photo detecting diode, and a gate electrode for receiving the control signal; and
the photo detecting diode including a first electrode connected to the fourth transistor, and a second electrode connected to ground,
wherein:
in a first period, the driving unit provides the reset signal at a first level to the gate electrode of the first transistor to turn on the first transistor, and to initialize the first node, and
in a second period, the driving unit provides:
a) the reset signal at a second level to the gate electrode of the first transistor to turn off the first transistor, the second transistor is turned on based on a voltage of the first node, and a first sample voltage applied to the second node, and
b) a gate signal to the gate electrode of the third transistor at the first level to turn on the third transistor and to output the first sample voltage to the data line, the driving unit changing the gate signal provided to the gate electrode of the third transistor to the first level before the driving unit changes the reset signal to the second level in the second period.

2. The X-ray detector of claim 1, wherein, in a third period, the photo detecting diode outputs a photo detecting voltage corresponding to the X-ray, the driving unit provides the control signal to the gate electrode of the fourth transistor at the first level to turn on the fourth transistor, and the fourth transistor applies the photo detecting voltage to the first node, the second transistor is turned on based on the voltage of the first node, and a second sample voltage is applied to the second node, and the driving unit provides the gate signal to the gate electrode of the third transistor at the first level to turn on the third transistor, and the second sample voltage applied to the data line.

3. The X-ray detector of claim 2, wherein the second sample voltage corresponds to a sum of the first sample voltage and the photo detecting voltage.

4. The X-ray detector of claim 1, wherein the photo detecting diode is a positive-intrinsic-negative (PIN) diode.

5. The X-ray detector of claim 1, wherein the first through fourth transistors are n-type or p-type thin film transistors (TFTs).

6. The X-ray detector of claim 1, wherein the first sample voltage corresponds to an offset voltage.

7. A plurality of photo detecting pixels included in an X-ray detector, each of the photo detecting pixels comprising:
a first transistor including a first electrode connected to a first power line, a second electrode connected to a first node, and a gate electrode for receiving a reset signal;
a second transistor including a first electrode connected to the first power line, a second electrode connected to a second node, and a gate electrode connected to the first node;
a third transistor including a first electrode connected to the second node, a second electrode connected to a data line, and a gate electrode for receiving a gate signal;
a fourth transistor including a first electrode connected to the first node, a second electrode connected to a photo detecting diode, and a gate electrode for receiving a control signal; and
the photo detecting diode including a first electrode connected to the fourth transistor, and a second electrode connected to ground, wherein the gate electrodes of the first transistor, the third transistor, and the fourth transistor are coupled to respective signal lines of a driving unit, and
wherein:
in a first period, the first transistor receives the reset signal at a first level, the first transistor is turned on by the reset signal at the first level and initialized, and
in a second period, the first transistor receives the reset signal at a second level, the first transistor turning off by the reset signal at the second level, the second transistor is turned on based on a voltage of the first node, and a first sample voltage is applied to the second node, and
the third transistor receives the gate signal at the first level, the gate signal at the first level turning on the third transistor to output the first sample voltage to the data line, the gate signal received by the gate electrode of the third transistor changing to the first level before the reset signal received by the gate electrode of the first transistor changes to the second level in the second period.

8. The photo detecting pixel of claim 7, wherein, in a third period,
the photo detecting diode outputs a photo detecting voltage corresponding to the X-ray, the gate electrode of the fourth transistor receives the control signal at the first level and the fourth transistor turns on, the photo detecting voltage is applied to the first node through the fourth transistor, the second transistor is turned on based on the voltage of the first node, and a second sample voltage is applied to the second node through the second transistor, and the gate electrode of the third transistor receives the gate signal at the first level and turns on, and the second sample voltage is output to the data line.

9. The photo detecting pixel of claim 8, wherein the second sample voltage corresponds to a sum of the first sample voltage and the photo detecting voltage.

10. The photo detecting pixel of claim 7, wherein the photo detecting diode is a positive-intrinsic-negative (PIN) diode.

11. The photo detecting pixel of claim 7, wherein the first through fourth transistors are n-type or p-type thin film transistors (TFTs).

12. The photo detecting pixel of claim 7, wherein the first sample voltage corresponds to an offset voltage.

13. An X-ray detector, comprising:
a panel for detecting an X-ray radiated from an X-ray generator and for outputting an electrical signal corresponding to the X-ray, the panel including photo detecting pixels formed at intersections of gate lines with data lines;
a driving unit for providing a reset signal and a control signal to the photo detecting pixels and for providing a gate signal to the gate lines;
a plurality of signal lines coupled between the driving unit and the photo detecting pixels of the panel; and
a signal processing unit connected to the photo detecting pixels via the data lines and for outputting an image signal corresponding to the electrical signal output from the photo detecting pixels, wherein the signal processing unit generates a photo detecting voltage from first and second sample voltages generated from a plurality of photo detecting pixels,
wherein each of the photo detecting pixels includes:
a first transistor including a first electrode connected to a first power line, a second electrode connected to a first node, and a gate electrode for receiving the reset signal;
a second transistor including a first electrode connected to the first power line, a second electrode connected to a second node, and a gate electrode connected to the first node;
a third transistor including a first electrode connected to the second node, a second electrode connected to one of the data lines, and a gate electrode connected to one of the gate lines;
a fourth transistor including a first electrode connected to the first node, a second electrode connected to a photo detecting diode, and a gate electrode for receiving the control signal; and
the photo detecting diode including a first electrode connected to the fourth transistor, and a second electrode connected to ground,
wherein:
in a first period, the driving unit provides the reset signal at a first level to the gate electrode of the first transistor to turn on the first transistor, and to initialize the first node, and
in a second period, the driving unit provides:
a) the reset signal at a second level to the gate electrode of the first transistor to turn off the first transistor, the second transistor is turned on based on a voltage of the first node, and a first sample voltage applied to the second node, and b) a gate signal to the gate electrode of the third transistor at the first level to turn on the third transistor and to output the first sample voltage to the data line, the driving unit changing the gate signal provided to the gate electrode of the third transistor to the first level before the driving unit changes the reset signal to the second level in the second period.

* * * * *